United States Patent
Katsaounis

[19]

[11] Patent Number: 6,116,204
[45] Date of Patent: Sep. 12, 2000

[54] OIL SCRAPER PISTON RING

[75] Inventor: Evangelos Katsaounis, Leverkusen, Germany

[73] Assignee: Federal-Mogul Burscheid GmbH, Burscheid, Germany

[21] Appl. No.: 09/391,446

[22] Filed: Sep. 8, 1999

[30] Foreign Application Priority Data

Sep. 8, 1998 [DE] Germany .......................... 198 40 918

[51] Int. Cl.[7] ........................................................ F16J 9/06
[52] U.S. Cl. ........................................ 123/193.6; 277/476
[58] Field of Search ................ 123/193.6; 277/458–462, 277/486, 487, 472, 476, 492, 493

[56] References Cited

U.S. PATENT DOCUMENTS

| | | | |
|---|---|---|---|
| 4,045,036 | 8/1977 | Shunta | 277/476 |
| 4,473,232 | 9/1984 | Umeha | 277/472 |
| 4,522,412 | 6/1985 | Kubo | 277/476 |
| 5,295,696 | 3/1994 | Harayama et al. | 277/476 |

FOREIGN PATENT DOCUMENTS

| | | |
|---|---|---|
| 1333377 | 6/1963 | France . |
| 1 065 235 | 3/1960 | Germany . |
| 2 020 010 | 11/1971 | Germany . |
| 32 14 815 | 11/1986 | Germany . |
| 42 00 489 | 9/1995 | Germany . |

*Primary Examiner*—Marguerite McMahon
*Attorney, Agent, or Firm*—Venable; Gabor J. Kelemen

[57] ABSTRACT

A single-piece oil scraper piston ring includes a ring axis and first, second and third axially mutually spaced runner webs having a respective first, second and third runner face adapted to slidingly engage an engine cylinder wall during operation. The first and third runner webs flank the second runner web. A first connecting web couples the first runner web to the second runner web and a second connecting web couples the third runner web to the second runner web. First and second throughgoing oil outflow holes are provided in the first and second connecting webs, respectively. The piston ring further includes a first groove having a first side wall forming part of the first runner web and a second side wall; and a second groove axially spaced from the first groove and having a first side wall and a second side wall which forms part of the third runner web. First and second hose springs are received in the first and second grooves, respectively. The first hose spring exerts a force on the first side wall of the first groove for urging the first runner face radially outwardly and the second hose spring exerts a force on the second side wall of the second groove for urging the third runner face radially outwardly.

6 Claims, 1 Drawing Sheet

OIL SCRAPER PISTON RING

CROSS REFERENCE TO RELATED APPLICATION

This application claims the priority of German Application No. 198 40 918.4 filed Sep. 8, 1998, which is incorporated herein by reference.

BACKGROUND OF THE INVENTION

The invention relates to an oil scraper piston ring for internal-combustion engines and is of the type which has a one-piece ring body whose runner face is subdivided into three partial runner faces Radially throughgoing oil outflow apertures are provided between adjoining partial runner faces Up-to-date internal-combustion engines are conventionally provided with pistons which have a first and a second compression ring and an oil scraper ring. Thus, three axially spaced circumferential grooves have to be provided an the piston face for accommodating the three piston rings. The oil scraper piston rings used for this purpose are of steel or cast iron and have an R or X-shaped cross-sectional configuration so that on the circumferential surface of the piston ring oriented towards the cylinder two runner webs are formed whose outer surfaces function as runner faces. A circumferential groove for receiving a hose spring is provided in the radially inner surface (back surface) of the piston ring. Such a piston ring is disclosed, for example, in German Patent No. 42 00 489.

For improving the scraping function of the oil scraper piston ring, among others the tangential force of the hose spring may be utilized.

The force of the spring affecting the runner webs generates, in case of small sliding faces, a relatively large specific area pressure. Since, however, the wear of the slidingly engaging components increases as the area pressure increases, the service life of such rings is reduced and with increasing wear a deterioration of the scraping action occurs.

To improve the oil scraping effect, it is conventional to provide the runner faces of the runner webs with a wear-resistant coating and also, to increase the number of webs. German Patent No. 10 65 235 discloses an oil scraper piston ring which has three runner webs whose outer faces engage the inner face of the cylinder wall.

In case more than two runner webs are present in the ring structure, however, the engineering problem is presented that during engine operation, because of the temperature-caused distortions, not all the runner faces lie simultaneously on the cylinder wall. As a solution of such a problem, conventionally only one or two web faces have been provided with a wear-resistant coating. The web without a wear-resistant protective coating has been dimensioned with a radial excess, so that the uncoated web, during operation, wears down in such a manner that after a certain time period all the webs lie against the inner cylinder surface.

SUMMARY OF THE INVENTION

It is an object of the invention to provide an improved piston ring of the above type in which all runner faces lie against the cylinder wall even at the beginning of the service life of the piston ring.

This object and others to become apparent as the specification progresses, are accomplished by the invention, according to which, briefly stated, the single-piece oil scraper piston ring includes a ring axis and first, second and third axially mutually spaced runner webs having a respective first, second and third runner face adapted to slidingly engage an engine cylinder wall during operation. The first and third runner webs flank the second runner web. A first connecting web couples the first runner web to the second runner web and a second connecting web couples the third runner web to the second runner web. First and second throughgoing oil outflow holes are provided in the first and second connecting webs, respectively. The piston ring further includes a first groove having a first side wall forming part of the first runner web and a second side wall; and a second groove axially spaced from the first groove and having a first side wall and a second side wall which forms part of the third runner web. First and second hose springs are received in the first and second grooves, respectively. The first hose spring exerts a force on the first side wall of the first groove for urging the first runner face radially outwardly and the second hose spring exerts a force on the second side wall of the second groove for urging the third runner face radially outwardly.

According to an advantageous feature of the invention the spring bed is so configured that the principal power path of the hose spring, that is, the normal force affecting the outer groove flanks may be set such that the outer (flanking) runner faces are movable relative to the middle runner face. In this manner all runner faces are, at all times, in engagement with the runner face of the inner cylinder wall.

BRIEF DESCRIPTION OF THE DRAWING

The sole

DESCRIPTION OF THE PREFERRED EMBODIMENT

Figure 1:
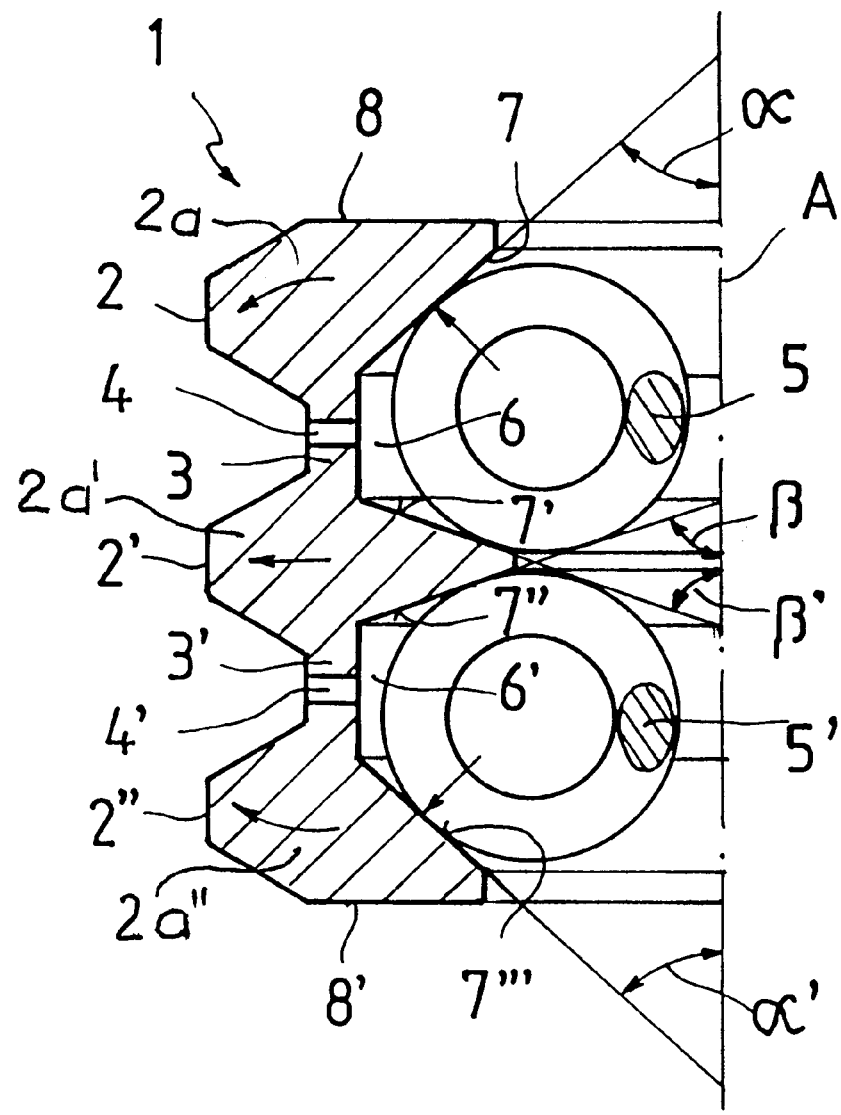
FIG. 1 is an axial sectional view of a radial half of an oil scraper piston ring according to a preferred embodiment of the invention.

The oil scraper piston ring 1 shown in FIG. 1 is a one-piece ring body made of steel. The three axially spaced annular webs 2a, 2a' and 2a" whose outer surfaces form runner faces 2, 2' and 2" are connected to one another with relatively narrow annular connecting webs 3, 3'.

The radial thickness of the connecting webs 3, 3' is very small relative to the entire piston ring surface so as to permit the flanking webs 2a and 2a" to move radially relative to the middle web 2a'. In the connecting webs 3, 3' respective oil outflow holes 4, 4' are provided which further reduce the stiffness of the connecting webs 3, 3'.

Two axially spaced annular grooves 6, 6' serving as spring beds are provided for accommodating respective annular hose springs 5, 5'. The grooves 6, 6' have respective groove flanks (side walls) 7, 7' and 7", 7'". The side wall 7 of the groove 6 forms part of the runner web 2a, while the side wall 7'" of the groove 6' forms part of the runner web 2a". The groove flanks 7, 7'" located adjacent the respective radial outer faces 8, 8' of the oil scraper piston ring 1 extend at an oblique angle α, α' to the piston ring axis A and may have a range between 10° and 70°. The groove flanks 7', 7" disposed respectively opposite the groove flanks 7, 7'" extend at an angle β,β' to the piston zing axis A and may have a range between 30° and 90°. By means of angles α, α', α distribution of the tangential force exerted on the runner faces 2, 2', 2" may be set. Dependent upon the piston ring material and dimension, optimal angles may be set for various uses. As shown in FIG. 1, the angle α, α' is smaller than the angle β, β'. It is also feasible to dimension the hose springs 5, 5' differently from one another to thus press the runner faces 2, 2' with unlike forces against the cylinder wall The runner faces 2, 2' and 2'' may be provided with a wear-resistant protective layer.

By means of the oil scraper piston ring according to the invention, it is possible to alter the conventional piston assembly formed of two compression rings and one oil scraper ring and to dispense with one compression ring. The sealing face formed by the thus omitted compression ring is applied in the oil scraper piston ring according to the invention so that the total number of the sealing faces cooperating within the cylinder wall remains the same while, at the same time, the piston has one ring groove less.

It will be understood that the above description of the present invention is susceptible to various modifications, changes and adaptations, and the same are intended to be comprehended within the meaning and range of equivalents of the appended claims.

What is claimed is:

1. A single-piece oil scraper piston ring for an internal-combustion engine, comprising
   (a) a ring axis;
   (b) first, second and third axially mutually spaced runner webs having a respective first, second and third runner faces adapted to slidingly engage an engine cylinder wall during operation; said first and third runner webs flanking said second runner web;
   (c) a first connecting web coupling said first runner web to said second runner web;
   (d) a second connecting web coupling said third runner web to said second runner web;
   (e) first and second throughgoing oil outflow holes provided in said first and second connecting webs, respectively;
   (f) a first groove having a first side wall forming part of said first runner web and a second side wall opposite said first side wall;
   (g) a second groove being axially spaced from said first groove and having a first side wall and a second side wall; said second side wall of said second groove forming part of said third runner web and being situated opposite said first side wall of said second groove; and
   (h) first and second hose springs received in said first and second grooves, respectively; said first hose spring exerting a force to said first side wall of said first groove for urging said first runner face radially outwardly and said second hose spring exerting a force to said second side wall of said second groove for urging said third runner face radially outwardly.

2. The oil scraper piston ring as defined in claim 1, wherein the first side wall of said first groove and the second side wall of said second groove each form an oblique first angle with said ring axis; and the second side wall of said first groove and the first side wall of said second groove each form a second angle with said ring axis.

3. The oil scraper piston ring as defined in claim 2, wherein said first angle is smaller than said second angle.

4. The oil scraper[ p]iston ring as defined in claim 2, wherein said first angle is between 10° and 70° and said second angle is between 30° and 90°.

5. The oil scraper piston ring as defined in claim in said first and second hose springs are arranged symmetrically with respect to one another as related to said ring axis.

6. The oil scraper piston ring as defined in claim 1, wherein said first and second hose springs exert unlike tangential forces.

* * * * *